United States Patent
Holden et al.

[11] Patent Number: 6,147,997
[45] Date of Patent: Nov. 14, 2000

[54] MECHANISM TO SUPPORT AN UTOPIA INTERFACE OVER A BACKPLANE

[75] Inventors: Brian Holden, Sunnyvale; Mitri Halabi, San Jose; Darren Braun, Fremont, all of Calif.

[73] Assignees: PMC-Sierra (Maryland), Inc., Burnaby, Canada; 3Com Corporation, Santa Clara, Calif.

[21] Appl. No.: 08/965,737

[22] Filed: Nov. 7, 1997

Related U.S. Application Data

[60] Provisional application No. 60/030,730, Nov. 8, 1996.

[51] Int. Cl.$^7$ .................... H04L 12/28; H04L 12/56
[52] U.S. Cl. .................... 370/395; 370/359; 370/419
[58] Field of Search .................... 370/395, 211, 370/252, 321, 419, 420, 421, 423, 424, 428, 440, 400, 402, 404, 489, 532, 535, 536, 537, 539, 541, 542, 234, 232, 233, 359

[56] References Cited

U.S. PATENT DOCUMENTS

| | | | |
|---|---|---|---|
| 5,450,411 | 9/1995 | Hei | 370/352 |
| 5,513,180 | 4/1996 | Miyake et al. | 370/352 |
| 5,774,465 | 6/1998 | Lau et al. | 370/397 |
| 5,784,370 | 7/1998 | Rich | 370/395 |
| 5,867,677 | 2/1999 | Tsukamoto | 710/131 |
| 5,872,645 | 2/1999 | Proctor | 359/136 |
| 6,005,865 | 12/1999 | Lewis et al. | 370/398 |

*Primary Examiner*—Dang Ton
*Assistant Examiner*—Phirin Sam
*Attorney, Agent, or Firm*—Townsend and Townsend and Crew LLP; Kenneth R. Allen

[57] ABSTRACT

An UTOPIA level 2 interface over a backplane for connecting up to 31 Physical layer devices to one ATM layer device in a logically partitioned manner utilizing full bandwidth. The communications data is received on a first terminal at a first transfer rate. The communications data transfer rate is reduced from the first transfer rate to a second transfer rate. At the second transfer rate, the communications data is transferred over a backplane to a second terminal. On the second terminal, communications data transfer rate is increased from the second transfer rate to the first transfer rate. The first transfer rate is greater than the second transfer rate.

17 Claims, 2 Drawing Sheets

MECHANISM TO SUPPORT AN UTOPIA INTERFACE OVER A BACKPLANE

CROSS-REFERENCE TO RELATED APPLICATIONS

This application claims priority from U.S. Provisional Patent Application Ser. No. 60/030,730, filed Nov. 8, 1996, and is herein incorporated by reference.

BACKGROUND OF THE INVENTION

Asynchronous Transfer Mode (ATM) is a technique of transmitting, multiplexing, switching, and receiving information in a network. ATM provides a high-speed, low-delay network that supports any type of user traffic, such as data, image, video, and voice. ATM segments and multiplexes user traffic into small, fixed-length units called cells. The cell is transmitted as 53-bytes, with 5 bytes reserved for the cell header. Each cell is identified with virtual circuit identifiers that are contained in the cell header. An ATM network uses these identifiers to relay the traffic through high-speed switches.

The lowest layer of the ATM model is the physical layer. The physical layer is concerned with functions that are dependent on the physical medium itself. Basically, the physical layer sends and receives cells on a physical line. The physical layer provides mapping of ATM cells to a physical line. The physical layer devices can be either single chips or system level board designs.

The ATM layer resides on top of the physical layer of a conventional layered network protocol suite, but it does not require the use of a specific physical layer protocol. The ATM layer processes the user traffic contained in the cells. Incoming virtual circuit identifiers on a link are sent to the proper output link by the ATM layer. Also, the cell headers are generated and interpreted by the ATM layer. Only the upper layers of the ATM Model process the user traffic. The ATM layer is typically a single chip or system on a board.

The ATM Forum defines a specification for the protocol of transferring ATM cells between Physical layer and ATM layer devices. The specification is known as UTOPIA (Universal Test and Operations Physical Interface) for ATM. UTOPIA was proposed to standardize the interface between the various layers of the ATM architecture itself. In particular, the UTOPIA level 2 specification defines a protocol for a single ATM layer device to communicate with multiple Physical layer devices with respect to a 50 MHz clock. The UTOPIA level 2 specification defines that a total of 31 Physical layer devices may be connected to a single ATM layer device.

Typically, system printed circuit boards have dimensions that do not easily accommodate 31 Physical devices and support hardware. The typical solution is to partition devices onto several boards connected by a backplane. A problem then arises when using multiple Physical layer devices with respect to a 50 MHz signal. It is difficult to maintain signal integrity over a 50 MHz multi-access bus.

The UTOPIA level 2 standard defines the data line and protocol signals between chips, it does not define the specific physical connections between chips. Smaller systems may implement an entire system on a single printed circuit board with different components communicating with one another via bus traces on the printed circuit board. In this case, it may be possible to implement the UTOPIA level 2 interface in a straightforward manner, without much modification to account for the physical requirements of the printed circuit board traces.

However, in many larger ATM switches, it may be desirable to construct a switch out of a number of separate printed circuit boards. In such a case, a standard way for multiple printed circuit boards to communicate with one another would be through use of a backplane, as is known in the art. A problem arises in attempting to use an UTOPIA level 2 interface on a backplane in that, at the 50 MHz frequency specified in an UTOPIA level 2 interface, trace lengths and capacitance are very large factors affecting the integrity of signals on backplane wires. Therefore, a straightforward adaptation of UTOPIA level 2 interface onto a backplane will in many cases not provide adequate performance in a high performance ATM system. Electromagnetic signal theory dictates that a 50 MHz trace length and capacitance become large factors in maintaining the shape and integrity of signals. At 25 MHz, the trace length and capacitance become less of a factor making backplane designs much easier. However, when using a 25 MHz clock, there is a division of bandwidth.

Ideally, what is needed is a method and apparatus for allowing up to 31 Physical layer devices to be connected to one ATM layer device utilizing full bandwidth. Also, a method and apparatus capable of providing a simplified but standardized backplane interface for UTOPIA level 2 or similar bus interface standards.

SUMMARY OF THE INVENTION

The present invention provides systems and methods for utilizing an UTOPIA level 2 interface over a backplane to connect up to 31 Physical layer devices to one ATM layer device in a logically partitioned manner utilizing full bandwidth.

An UTOPIA interface over a backplane allows the Physical layer devices placed on several boards to connect with other boards via a backplane. An UTOPIA interface over a backplane reproduces standards based behavior on the far end of the backplane with respect to the ATM layer. Hence, the Physical layer devices operate using normal 50 MHz UTOPIA level 2 defined handshakes. This requires the ATM layer device to acccept the cell available handshakes at a time later than it would otherwise. Additional hardware is placed between the ATM layer devices and Physical layer devices in the form of demultiplexers and multiplexers.

The method of the present invention includes the steps of receiving communications data on a first terminal at a first transfer rate, reducing the rate of transfer of the communications data from the first transfer rate to a second transfer rate, transmitting the communications data over a backplane at the second transfer rate, receiving the communications data on a second terminal, and increasing the rate of transfer of the communications data from the second transfer rate to the first transfer rate. The first transfer rate is greater than the second transfer rate. The method also includes the steps of accepting the cell available handshake later than it would otherwise to reproduce the standardized timing at the PH1 interface which is on the other side of the backplane and the means to configure such operation.

The device of the present invention includes a first demultiplexer coupled to an ATM layer device, a first multiplexer coupled to the first demultiplexer using a UTOPIA level 2 interface over the backplane and a plurality of physical layer devices, a second multiplexer coupled to the ATM layer device, and a second demultiplexer coupled to the second multiplexer using the UTOPIA level 2 interface over the backplane and the plurality of physical layer devices.

The use of a backplane has several advantages. The signals across the backplane switch at 25 MHz which is physically manageable. Another advantage is the backplane allows for a convenient line card design that is useful in communication switches. Yet another advantage is the bandwidth associated with 50 MHz UTOPIA is not sacrificed since there are twice as many lines on the 25 MHz backplane. Furthermore, using backplane UTOPIA, the trace length and capacitance become less of a factor making backplane designs much easier to implement.

A further understanding of the nature and advantages of the inventions herein may be realized by reference to the remaining portions of the specification and the attached drawings.

DESCRIPTION OF THE PREFERRED EMBODIMENT

In the description that follows, the present invention will be described in reference to a preferred embodiment that operates over a backplane. In particular, examples will be described which illustrate particular applications of the invention over a backplane. The present invention, however, is not limited to any particular information source nor limited by the examples described herein. Therefore, the description of the embodiments that follow are for purposes of illustration and not limitation.

The UTOPIA level 1 standard defines a mechanism for connecting one ATM layer device to one physical layer device. Even though the description that follows describes the UTOPIA level 2 standard, the description also applies to an UTOPIA level 1 interface.

The UTOPIA level 2 standard defines a mechanism for separate components in an ATM system to communicate data in order to effectuate ATM network switching. For example, an ATM switching system may consist of an ATM switch fabric device on a single chip or a group of related chips connected to up to 31 additional chips, each of the 31 chips providing a physical interface to a transmission line. The UTOPIA level 2 interface defines a standard bus and protocol for communicating data between these devices, so that an ATM system builder can purchase an ATM switch fabric chip from a different vendor than he purchases the physical layer interface chips and connect them on a board with some confidence that they can all communicate with one another via the UTOPIA level 2 standardized bus interface.

Figure 1:
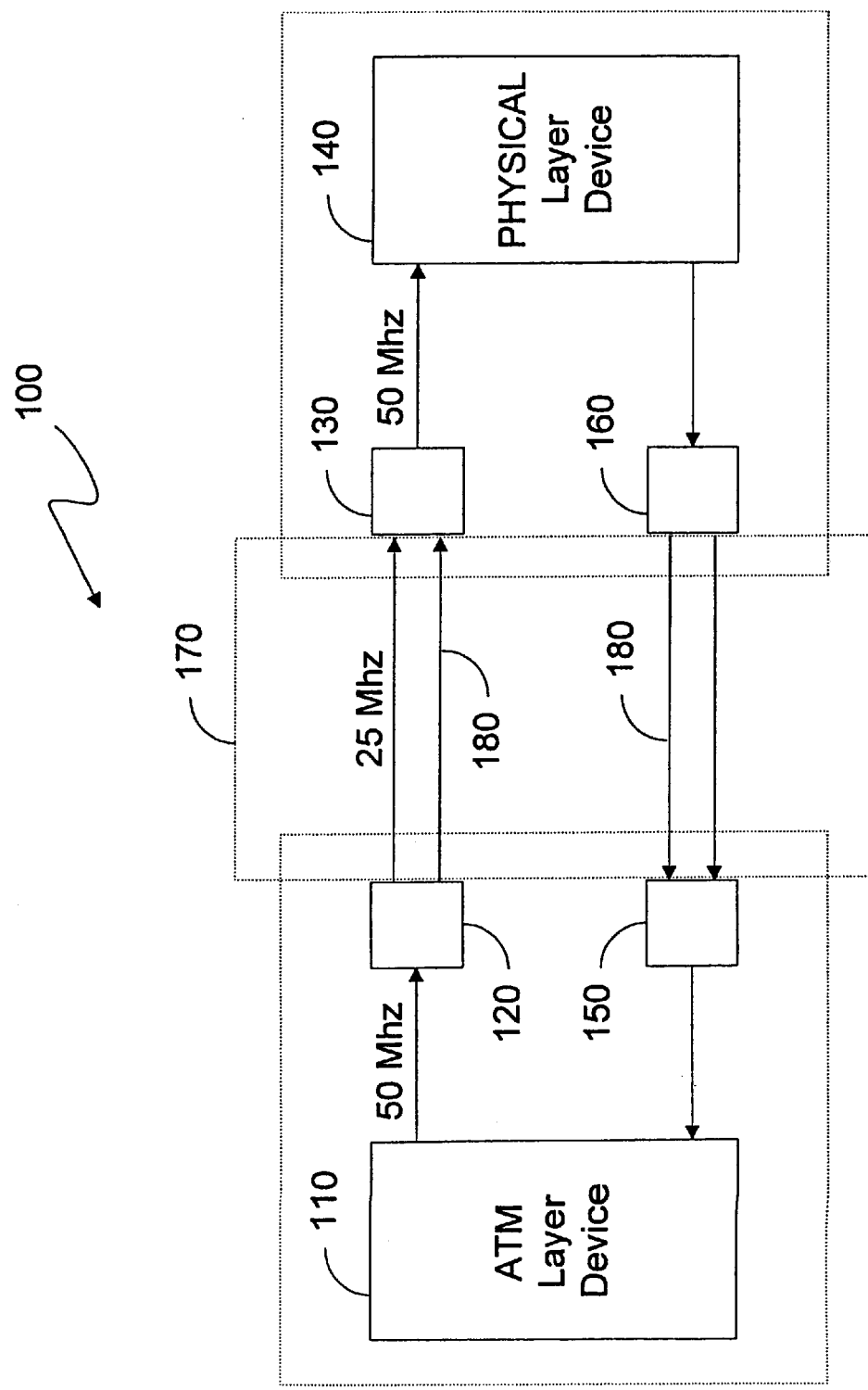
FIG. 1 illustrates the system and method for connecting and transmitting data over the UTOPIA interface over a backplane.

FIG. 1 illustrates the system and method for connecting and transmitting data over the UTOPIA interface over a backplane. Communications data is typically transferred from an ATM layer device 110 to one or more physical layer devices 140 over a backplane 170. The communications data may be address, data and control information or any combination thereof. Communications data sent via ATM cells are transmitted at a first transfer rate. Typically, the first transfer rate is approximately equal to 50 MHz. The backplane 170 can be a bus or any other communications line that carries information. Cards are plugged into the backplane 170 and typically each card has its own microprocessor and is adapted to or supports the standard interface. If the backplane 170 is a bus, the communications data travels from the ATM layer device 110 to the physical layer device 140 without delay since the bus is large enough to transfer the communications data along multiple paths across the backplane 170. If the backplane 170 is a set of point to point lines connecting the ATM layer device 110 to the physical layer devices 140, the first conversion device 120 can include demultiplexing logic together with First-In First-Out's (FIFO's). The FIFO's are used to store cells and act as a buffer so that the communications data can be transferred over the backplane 170 at a second transfer rate. The first transfer rate is greater than the second transfer rate. Each FIFO stores the cells until the data can be sent at a second transfer rate to the proper physical layer device.

The ATM layer device 110 is coupled to one or more physical layer devices 140 over backplane 170 through one or more conversion devices. These conversion devices increase and decrease the transfer rate of the communications data as it travels between the ATM layer device 110 and the physical layer device 140.

In the preferred embodiment, the ATM layer device 110 is coupled to a first conversion device 120 that decreases the transfer rate of the communications data. Generally, the ATM cells are transmitted from the ATM layer device 110 to the first conversion device 120 at a transfer rate in one embodiment approximately equal to 50 MHz. Typically, the first conversion device 120 is a demultiplexer. The demultiplexer divides the ATM cell data along two or more transmission lines 180 and sends the data to a second conversion device 130 along the transmission lines 180. Two transmission lines 180 are generally used resulting in data being transmitted across the backplane 170 at a second transfer rate. The second transmission rate in one embodiment is approximately equal to 25 MHz. Sending the communications data at a second transmission rate allows the signal to maintain its shape and integrity across long traces on the backplane 170.

The second conversion device 130 increases the transfer rate of the data to the first transfer rate. Typically, the second conversion device 130 is a multiplexer. The multiplexer reforms the signal to allow for the communications data to be received by the physical layer device over a single transmission channel in the manner it was sent. The ATM layer device 110 timing is adjusted to expect the inherent delays that are encountered when multiplexing and demultiplexing the signals onto the backplane 170 while operating on a 50 MHz clock. The second conversion device 130 can be removed from the circuit resulting in the physical layer devices 140 receiving the communications data at a first transfer rate.

Communications data can also be sent from the physical layer device 140 to the ATM layer device 110. This is accomplished in a similar manner as described above. The physical layer device 140 is coupled to a third conversion device 160. The third conversion device 160 reduces the transfer rate of the communications data. Typically, the third conversion device 160 is a demultiplexer. The demultiplexer divides the ATM cell data along two or more transmission lines and sends the data to a fourth device 150 along the two transmission lines 180. Two transmission lines 180 are generally used resulting in data being transmitted across the backplane 170 at a transmission rate approximately equal to 25 MHz. Sending the communications data at a transmission rate approximately equal to 25 MHz allows the signal to maintain its shape and integrity across long traces on the backplane 170. The fourth conversion device 150 increases the transfer rate of the data. Typically, the fourth conversion device 150 is a multiplexer.

Figure 2:
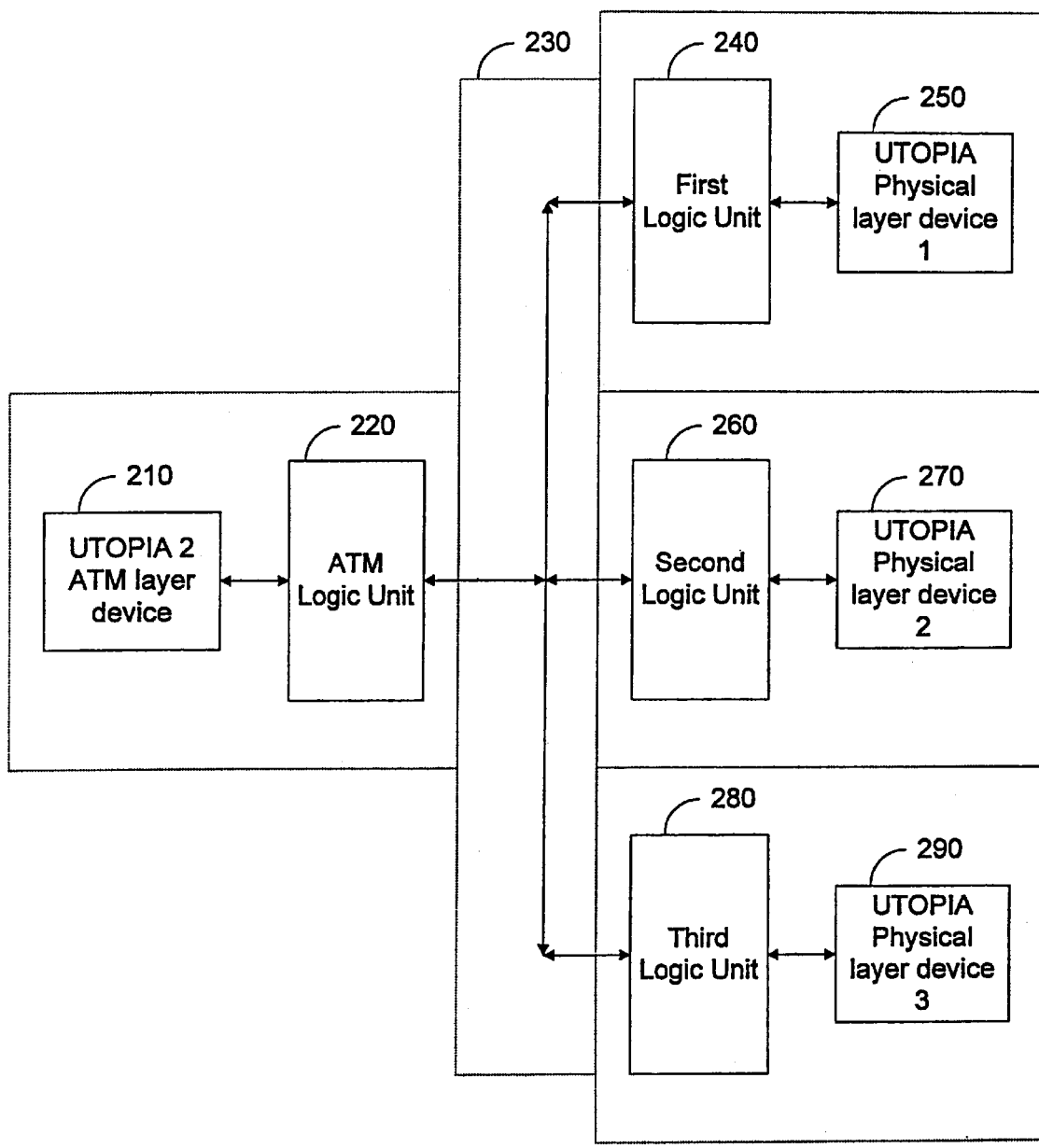
FIG. 2 illustrates the method for connecting and transmitting data from an ATM layer device to multiple physical layer devices over an UTOPIA level 2 interface over a backplane.

FIG. 2 illustrates the method for connecting and transmitting data from an ATM layer device to multiple physical layer devices over an UTOPIA level 2 interface over a backplane. As shown in FIG. 2, three physical layer devices 250, 270, and 290 are coupled to the ATM layer device 210 over a backplane 230. The UTOPIA level 2 chips are designed to run at 50 MHz, the backplane 230 is designed to run multiple busses each running at 25 MHz serving one or multiple Physical cards. Three physical layer devices are shown in FIG. 2, however, up to 31 physical layer devices can be coupled to the ATM layer device 210 utilizing full bandwidth.

The ATM cells are sent from the ATM layer device 210 to the ATM logic unit 220. The ATM logic unit 220 includes multiplexing and demultiplexing logic together with FIFO logic. The ATM logic unit 220 can be any device or combination of devices that reduce or decrease the transmission rate of a signal. Thereafter, the data is transmitted over the backplane 230 at approximately 25 MHz to multiple logic units.

For example, the data may be received by a first logic unit 240. The first logic unit 240 includes multiplexing and demultiplexing logic together with FIFO's. The data is received by the first logic unit 240 and the first logic unit 240 increases the transfer rate to approximately 50 MHz. The multiple logic units need not perform a rate transfer. In a similar manner, the data can be transferred to up to 31 physical layer devices. Furthermore, the data can be transferred from the 31 physical layer devices to the ATM layer device 210. Reverse logic is utilized in this situation.

The invention has now been explained with reference to specific embodiments. Other embodiments will be apparent to one of ordinary skill in the art. It is therefore not intended that this invention be limited, except as indicated by the appended claims.

What is claimed is:

1. A method for carrying communications data over a backplane, comprising the steps of:
   receiving communications data from a first device at a first terminal at a first transfer rate, wherein said first terminal is constrained to receive said communications terminal at said first transfer rate;
   delaying said communications data and associated control signals to reproduce a standardized timing related to said first transfer rate while decreasing the rate of transfer of said communications data from said first transfer rate to a second transfer rate, said first transfer rate being greater than said second transfer rate;
   transmitting said communications data over a backplane at said second transfer rate; thereafter
   increasing the rate of transfer of said communications data from said second transfer rate to said first transfer rate;
   receiving said communications data at said first transfer rate on a second terminal, wherein said second terminal is constrained to transmit from said communications terminal at said first transfer rate;
   accepting at said second terminal a control signal at a non-standardized time so that a second device can respond at a standardized time; and
   sending the communications data from said second terminal to said second device.

2. The method of claim 1 wherein said communications data comprises ATM cells.

3. The method of claim 1 wherein said first transfer rate is approximately equal to 50 MHz.

4. The method of claim 1 wherein said second transfer rate is less than 30 MHz.

5. The method of claim 1 wherein said step of sending occurs at a transfer rate in the range of 49 MHz to 51 MHz.

6. A method for transferring ATM cells over a backplane, comprising the steps of:
   demultiplexing ATM cells on a first terminal constrained to operate at a first transfer rate;
   delaying control signals and said ATM cells to reproduce a standardized timing related to said first transfer rate while decreasing the rate of transfer of said ATM cells from said first transfer rate to that of a second transfer rate, said first transfer rate being greater than said second transfer rate;
   transmitting multiple ones of said demultiplexed ATM cells generally in parallel over said backplane at said second transfer rate, said ATM cells having a greater overall transfer rate than available over said backplane; and
   multiplexing said ATM cells on a second terminal in order to reassemble said ATM cells for further transmission at said first transfer rate.

7. The method of claim 6 wherein said second transfer rate is less than 30 MHz.

8. The method of claim 6 further comprising the step of sending said ATM cells from said ATM layer device to said demultiplexer at a transfer rate approximately equal to 50 MHz.

9. The method of claim 6 further comprising the step of sending said ATM cells from said multiplexer to said plurality of physical layer devices at a transfer rate approximately equal to 50 MHz.

10. A method for transferring ATM cells over a backplane, comprising the steps of:
    coupling an ATM layer device to a demultiplexer;
    coupling a plurality of physical layer devices to a multiplexer;
    coupling said demultiplexer to said multiplexer; and
    transferring said ATM cells from said demultiplexer to said multiplexer over said backplane while delaying control signals and ATM cells to reproduce a standardized timing related to a first transfer rate at a second transfer rate in order to decrease the rate of transfer of individual ones of said ATM cells via said backplane to that of said second transfer rate, said first transfer rate being greater than said second transfer rate.

11. A method for transferring ATM cells over a backplane, comprising the steps of:
    coupling an ATM layer device to a multiplexer;
    coupling a plurality of physical layer devices to a demultiplexer;
    coupling said multiplexer to said demultiplexer; and
    transferring said ATM cells from said demultiplexer to said multiplexer over said backplane while delaying control signals and ATM cells to reproduce a standardized timing related to a first transfer rate at a second transfer rate in order to decrease the rate of transfer of said ATM cells data from said first transfer rate to that of said second transfer rate, said first transfer rate being greater than said second transfer rate.

12. The method of claim 11 further comprising the step of sending said ATM cells from said multiplexer to said ATM layer device at an overall transfer rate approximately equal to 50 MHz.

13. The method of claim 11 further comprising the step of sending said ATM cells from said plurality of physical layer devices to said demultiplexer at a transfer rate approximately equal to 50 MHz.

14. A method for implementing a UTOPIA interface over a backplane, comprising the steps of:

demultiplexing ATM cells on a first terminal constrained to operate at a first transfer rate;

delaying control signals and said ATM cells to reproduce a standardized timing related to a first transfer rate at a second transfer rate in order to decrease the rate of transfer of said ATM cells data from said first transfer rate to said second transfer rate;

transmitting said ATM cells at said second transfer rate using a UTOPIA level 2 interface over said backplane, said ATM cells having a greater transfer rate than available using said UTOPIA level 2 interface over said backplane; and multiplexing said ATM cells on a second terminal.

15. A method for implementing a UTOPIA interface over a backplane, comprising the steps of:

demultiplexing ATM cells on a first terminal constrained to operate at a first transfer rate;

delaying control signals and said ATM cells to reproduce a standardized timing related to a first transfer rate at a second transfer rate in order to decrease the rate of transfer of said ATM cells data from said first transfer rate to said second transfer rate;

transmitting said ATM cells at a second transfer rate using a UTOPIA level 2 interface over said backplane constrained to operate at said second transfer rate, said first transfer rate being greater than said second transfer rate; and multiplexing said ATM cells on a second terminal.

16. An apparatus for implementing a UTOPIA interface over a backplane having a plurality of physical layer devices and an ATM layer device, said backplane being constrained to operate at a transfer rate which is less than a first transfer rate, comprising:

a first demultiplexer coupled to an ATM layer device, said ATM layer device constrained to operate as said first transfer rate;

a first multiplexer coupled to said first demultiplexer using a UTOPIA level 2 interface over said backplane constrained to operate at less than said first transfer rate and a plurality of physical layer devices;

a second multiplexer coupled to said ATM layer device; and a second demultiplexer coupled to said second multiplexer using said UTOPIA level 2 interface over said backplane and said plurality of physical layer devices.

17. The apparatus according to claim 16 further including control means of said second multiplexer responsive to a control signal from said second multiplexer at a non-standardized time for permitting said second multiplexer to respond at a standardized time.

* * * * *